Patented Oct. 5, 1943

2,331,194

UNITED STATES PATENT OFFICE 2,331,194

PRINTING INK

Clarence E. Irion, Montclair, N. J., assignor to General Printing Ink Corporation, New York, N. Y., a corporation of Delaware No Drawing. Application August 11, 1939, Serial No. 289,592

12 Claims. (Cl. 106—31)

This invention relates to printing inks of the type suitable for use in intaglio or rotogravure printing, and more particularly to rapidly drying intaglio inks containing suitable asphalts or asphalt mixtures.

In the past, rotogravure inks have been almost universally compounded by dissolving gilsonite, asphalts, mixtures of gilsonite and asphalts, or suitable gums and the like in aromatic hydrocarbon solvents such as benzol and toluol. These aromatic hydrocarbons are good solvents for the gilsonite, etc., and give inks of the desired and necessary characteristics. However, they present the disadvantage in such usage that their fumes are extremely toxic and hazardous to the health of the workmen and irritating to their eyes and throats, but their use has been continued nevertheless because of the lack of other solvents in a commercially feasible price range, which would operate satisfactorily to produce the qualities necessary in an ink of this type.

The petroleum hydrocarbons, while readily available in superabundance and in widespread general usage and even cheaper than the aromatics, were unsatisfactory in having much too limited solvent power for the gilsonite, asphalts and other suitable binders used to produce satisfactorily usable inks.

Other known organic solvents which were suitable in characteristics were economically unsuitable because of their high prices.

One of the objects of the present invention is to provide a printing ink of the intaglio type which is equal in all respects to the prior art inks but is free from the toxic and irritating characteristics of commercial rotogravure inks using aromatic hydrocarbon solvents.

Another object is to provide such an ink in which the solvent has a lower boiling point but a higher flash point than such other inks.

Another object of the invention is the preparation of such inks with the use of non-toxic solvents which evaporate practically instantaneously to produce a hard, non-tacky, non-smearing, non-offsetting film.

A further object is to provide a rotogravure printing ink exhibiting rapid and complete solvent release upon printing thus providing a printed film which is free from objectionable tackiness, stickiness, tendency to smearing, off-setting and other such troubles.

A still further object is to prepare such inks at a cost comparable to that of the prior art commercial inks.

I have found that although, as long known, petroleum naphthas are unsuitable as the solvent for the gilsonite, etc., used for a rotogravure ink, nevertheless when such a naphtha is combined with a predetermined and controlled proportion of a properly selected aliphatic alcohol into a predetermined proportionate mixture thereof, the resulting mixture has greatly enhanced solvent properties quite adequate for the formulation of such materials into a most satisfactorily usable rotogravure ink. Also when properly admixed there will result rapid solvent release from the imprinted ink with resultant rapid drying, hard and non-smearing printed impressions—such ink being of the desired comparable cost, and having a lower boiling point and higher flash point than the rotogravure inks heretofore used. A properly prepared solvent mixture of such constituents will readily dissolve adequately large quantities of gilsonite, or mixtures of gilsonite and asphalts, despite the inadequate solvent powers of each constituent of the solvent, to produce an ink suitable for intaglio printing at the highest printing speeds used. I have found that petroleum naphthas have the power of forming mixtures with the aliphatic alcohols so that the resulting mixture has solvent powers for gilsonite, asphalts and mixtures of gilsonite and asphalts and the like which greatly exceeds the selective solvent powers of the several constituent liquids for such admixtures of widely varying constituents as are present in gilsonite, natural asphalts and mixtures thereof, whereby sufficient of such gilsonite, asphalt mixtures, etc., may be dissolved to give an ink of the desired high gilsonite content due to the dissolved gilsonite, etc., even when using natural asphalts, gilsonite, etc. By properly selecting the petroleum naphtha and the other aliphatic ingredients and controlling the proportionate admixture thereof a constant boiling solvent may be secured which has the necessarily high solvent powers for the several constituents of the gilsonite, etc., and which likewise has a boiling point sufficiently low so that the solvent evaporates with sufficient rapidity to permit the highest speed printing and likewise gives such rapid release of the solvent constituents in the chosen proportion that the character of the imprinted film is left such that it is non-tacky, non-smearing, quick setting, etc. Properly selected petroleum naphthas and aliphatic alcohols, when mixed in proper proportion produce an admixture in which the molecules of the two solvents have a strong influence on each other, so that such a mixture acts like a single liquid with properties quite different from either solvent or any other mixture of the two. The resulting mixture has solvent properties so different from either liquid alone, that these liquids in such mixture may now be used satisfactorily and with very superior results. The proportion which gives these greatly enhanced solvent properties and the single liquid action which makes for such desirable utility has been found to be that proportion which produces an azeotropic mixture. Petroleum naphthas and aliphatic alcohols form binary azeotropic mixtures which may be of the maximum boiling point-minimum vapor pressure type, or of the minimum boiling point-maximum vapor pressure type—which I have found to be of widely divergent characteristics. By selecting a petroleum naphtha with predetermined evaporation characteristics and a suitable alcohol of correspondingly chosen characteristics and mixing them in such proportions as to produce the binary azeotrope, of the minimum boiling point-maximum vapor pressure type a solvent of the characteristics described is obtained suitable for any printing speeds in intaglio printing, limited only by the mechanical press equipment now available.

A liquid mixture of such close composition could not be maintained in commercial practice, even if it were possible to produce it from a manufacturing standpoint. While the theoretical binary azeotropic composition is thus specific, nevertheless in the operations of this invention small and controlled variations from the correct percentage are possible. I have found practically that 10% deviation in proportions may be present provided it is on the right side of the azeotropic composition, as the case might be, and suitable superior results attained so far as a printing mixtures goes. The reason for this is that even under conditions which do not produce the perfect azeotropic mixture, the proportions may be so controlled that nearly all of the mixture present will be the azeotropic mixture. For example 22 isopropyl alcohol and 78 normal hexane (in round figures) gives the azeotropic mixture. Suppose a mixture of 30 isopropyl alcohol and 70 normal hexane. While this is not the perfect azeotropic mixture, nevertheless this 30-70 mixture is a liquid consisting of 89.75% of the binary azeotrope and 10.25% isopropyl alcohol. This gives 100 which accounts for the ratio of 70 plus 30 per cent. The binary azeotrope must have isopropyl alcohol and normal hexane in the ratio of 22 to 78 parts by weight. 22% of 89.75 is 19.75. 19.75 plus 10.25 equals 30. This takes care of the 70% of hexane. Thus a mixture of 70 hexane and 30 isopropyl alcohol actually consists of 89.75% binary azeotrope and 10.25% isopropyl alcohol. This is a composition so close to the azeotropic amounts that in practice it has been found to function quite satisfactorily in printing. In fact, when the admixture is so made that 75% or more of the azeotropic mixture solvent is present, it is ordinarily found, for a binary azeotropic mixture, to sufficiently approach the perfect azeotropic mixture to be practically usable. As the mixture is being prepared, e. g., by the addition of alcohol to hexane, the solvent capacity of the mixture increases quite rapidly as the alcohol is added to the naphtha with the maximum solvent capacity attained as the azeotropic mixture is reached after which the solvent capacity quickly decreases. Furthermore, while in some cases the amount of the asphalt or gilsonite which stays in solution does not materially decrease after the azeotropic proportions are exceeded, still the character of the resulting dissolved material changes quite markedly and I have found that substantial increases of 10% in some actual instances have produced a solvent such that the resulting solution of gilsonite or asphalt mixtures is quite useless as such printing ink. In general, it may be said that where gilsonite is to be dissolved the deviation from the azeotropic proportions should be on the side of an excess of alcohol, and for asphalt mixtures, the excess should be on the side of the petroleum. Also, on departure from the azeotropic mixture the constant boiling point characteristic disappears and also the vaporizing point rises. The percentage conditions explained above, also explain why this is and that distillation of such a mixture gives an amount of the binary azeotrope which varies with the amount distilled. As a result, if the percentage variation is too great and on the wrong side of the azeotropic mixture, the solvent left in the imprinted film changes its characteristics as to proportionate mixture, solvent capacity, etc., as drying takes place and rapidity of solvent release and the character of the resultant ink film are materially affected—so much so that the film may stay sticky, tacky and smearable for an impracticably long time.

For the practicing of this invention therefore the constituents should be used in the proportions to form such an azeotropic mixture, with its lowered constant boiling point, its high solvent capacity for the varied constituents of the gilsonite, asphalts, etc., its quick solvent release, etc., to give the most satisfactory results.

Mixtures may be made up having evaporation characteristics and other working properties suitable for practically every type and speed of printing found in the intaglio field depending on the original constituents, selected according to the boiling point desired; and by mixing them into the proper proportions with the gilsonite and other constituents will produce solutions of a viscosity suitable for intaglio printing at any speed and with any equipment used in the arts, substantially azeotropic solvent mixtures being most desirable for use.

An illustration of a very satisfactorily operating ink for very high-speed printing, according to the present invention, is:

EXAMPLE 1

*Solvent.*—Minimum boiling, maximum vapor pressure, binary azeotropic mixture of isopropyl alcohol and normal hexane,

| | Per cent by weight |
|---|---|
| Alcohol | 22 |
| Hydrocarbon | 78 |

The boiling point of this solvent is 61° C. at 760 millimeters pressure.

*Intaglio printing ink*

| | Per cent by weight |
|---|---|
| Above solvent | 65.00 |
| Gilsonite | 35.00 |
| | 100.00 |

Such an ink has a viscosity at 25° C. of 23 centipoises.

The hexane used in this Example 1 has a boiling point of 69° C. and is meant to be representative of a petroleum naphtha of boiling range 60°–75° C. The alcohol has a much higher boiling point (82.3° C.) and the resultant mixture has a fixed boiling point of the low order desired. The gilsonite solubility is greatly increased beyond the selective solubility of either of the constituents or the sum of their independent selective solubility capacities, and the gilsonite content may be increased readily to 50% or more by weight if a higher viscosity is required. Likewise a decrease in the percentage of gilsonite will give a solution with a lower viscosity.

EXAMPLE 2

*Solvent.*—Minimum boiling, maximum vapor pressure, binary azeotropic mixture of ethyl alcohol and normal heptane,

| | Per cent by weight |
|---|---|
| Alcohol | 48 |
| Hydrocarbon | 52 |

The boiling point of this solvent is 72° C. at 760 millimeters.

*Intaglio printing ink*

| | Per cent by weight |
|---|---|
| Above solvent | 65.00 |
| Gilsonite | 35.00 |
| | 100.00 |

Such an ink has a viscosity of 30 centipoises at 25° C.

The normal heptane has a boiling point of 98.4° C. and is used to represent a petroleum naphtha of boiling range 80–110° C. and the alcohol a boiling point of 78.5° C. Viscosities change with gilsonite concentration.

EXAMPLE 3

*Solvent.*—Minimum boiling, maximum vapor pressure, binary azeotropic mixture of normal propyl alcohol and normal octane,

| | Per cent by weight |
|---|---|
| Alcohol | 74 |
| Hydrocarbon | 26 |

The boiling point of this solvent is 95.0° C. at 760 millimeters pressure.

*Intaglio printing ink*

| | Per cent by weight |
|---|---|
| Abose solvent | 65.00 |
| Gilsonite | 35.00 |
| | 100.00 |

Such an ink has a viscosity of about 35 centipoises at 25° C.

The normal octane has a boiling point of 125.8° C. and here is used to represent a petroleum naphtha of boiling range 110–130° C. and the alcohol a boiling point of 97.8° C. Increased gilsonite will give increased viscosity. Decreased gilsonite will yield lower viscosity.

Another example of a satisfactory intaglio ink using a mixture of gilsonite and asphalt is

| | Per cent by weight |
|---|---|
| Solvent from Example 2 | 65 |
| Gilsonite | 30 |
| Asphalt | 5 |
| | 100 |

Such an ink has a viscosity of 45 centipoises at 25° C. and changes in the proportion of the asphalt and gilsonite mixture, as well as changes in the relative proportion of the mixture, give changes in viscosity. Such solvent mixtures may be made to contain upward of 50% of dissolved gilsonite, etc. and the viscosity may likewise be increased to upward of 50 centipoises at 25° C., if desired—although the examples given represent commercially satisfactory inks, the color to be determined by the addition of suitable pigments or coloring agents in the usual manner.

An intaglio ink such as Example 1 above is a very fast ink suitable for printing speeds up to 1,500 feet per minute; the ink of Example 2 is suitable for satisfactory printing speeds of 300–600 feet per minute and of Example 3 for slower speed printing in the range of 300 feet per minute of web speed. Using such suitable alcohols with petroleum naphtha of considerably lower boiling range of 30–50° C., known as commercial normal pentane, will give intaglio printing inks suitable for printing speeds not yet reached in actual intaglio printing operations; but for speeds attainable with present printing apparatus satisfactory operations may be had when the solvent mixture has a boiling point of the order of not substantially exceeding 135° C.

Of the aliphatic hydrocarbons the pentanes are probably the lowest boiling homologs which can be satisfactorily used to give inks whose evaporation rate will be slow enough for commercial purposes, although special conditions might arise in which the use of a lower hydrocarbon would be desirable. The preferred hydrocarbons under present printing conditions are those having 5 (pentane) to 9 (nonane) carbon atoms in the chain although the lower boiling homologs might be used if still higher printing speeds become feasible.

Alcohols which have been tried and found suitable for the practicing of this invention are those of the aliphatic series having 2 to 6 carbon atoms, for example ethyl, propyl, isopropyl, normal, iso, secondary and tertiary butyl, diethyl carbinol and dimethyl ethyl carbinol. Likewise esters and ethers may be used with these other materials to form ternary and quaternary azeotropic mixtures to form controlled mixtures of the desired and described characteristics. For example, a satisfactory ternary azeotropic mixture may comprise 50% isopropyl acetate, 38% isopropyl alcohol and 12% normal hexane, with a boiling point of between 75–80° C.

In preparing inks with these mixture-solvents, I may use the common body or binder constituents now employed. These include gilsonites, the common natural and residual asphalts, many natural and/or synthetic resins and the like. The gilsonites and asphalts are generally used because of their cheapness, but special properties may make desirable the use of some of the other usual binders.

The mixtures made from these selected constituents, admixed in the proportions to give said azeotropic mixture of a suitably low constant boiling point and having the suitably enhanced resultant solvent powers for the gilsonites, etc., may be satisfactorily used and give especially desirable operating conditions, at commercially comparable costs, and provide inks free from the operating objections of toxicity, etc. with the desired solvent release, quick setting, etc.

While the products herein described constitute preferred embodiments of the invention, it is to be understood that the invention is not limited to such precise products, and that changes may be made therein without departing from the scope of the invention which is defined in the appended claims.

What is claimed is:

1. An ink of the character described comprising as a major body or binder constituent a material selected from the group consisting of gilsonite, asphalt, and mixtures thereof, dissolved in a solvent consisting of a mixture having as essential major ingredients a petroleum naphtha and an aliphatic alcohol selected with respect to said petroleum naphtha to form a minimum boiling point-maximum vapor pressure azeotropic mixture therewith having a constant boiling point substantially below the boiling point of each such ingredient and enhanced solvent capacity with respect to said gilsonite, etc., body constituent materially in excess of the selective solvent capacity of the several ingredients of such admixed solvent if used alone said body material being dissolved in said solvent mixture in proportion to give a viscosity up to the order of 50 centipoises at 25° C. and said solvent having a boiling point of the order of 100° C. or less.

2. An ink of the character described comprising as a major body or binder constituent a material selected from the group consisting of gilsonite, asphalt, and mixtures thereof, dissolved in a solvent consisting of a mixture having as essential major ingredients a petroleum naphtha and an aliphatic alcohol admixed to form an azeotropic mixture thereof having a constant boiling point and enhanced solvent capacity with respect to said gilsonite, etc., body constituent said body material being dissolved in said solvent mixture in proportion to give a viscosity up to the order of 50 centipoises at 25° C.

3. An ink of the character described comprising as a major body or binder constituent a material selected from the group consisting of gilsonite, asphalt, and mixtures thereof dissolved, in a solvent consisting of a mixture having an essential major ingredients a petroleum naphtha having a boiling range up to 130° C. and an aliphatic alcohol admixed to form a minimum boiling point-maximum vapor pressure azeotropic mixture therewith having a constant boiling point of each ingredient and enhanced solvent capacity with respect to said gilsonite, etc., body constituent materially in excess of the selective solvent capacity of the several ingredients of said admixed solvent if used alone, said body constituent being dissolved in proportions sufficient to give a viscosity up to 50 centipoises or more at 25° C.

4. An ink of the character described comprising as a major body or binder constituent thereof a material selected from the group consisting of gilsonite, asphalt, and mixtures thereof, dissolved in a solvent consisting of a mixture having as essential major ingredients a petroleum naphtha and an aliphatic alcohol having a boiling point of the order of 100° C. or less and admixed with said petroleum naphtha to form a minimum boiling point-maximum vapor pressure azeotropic mixture having a constans boiling point substantially below the boiling point of each ingredient and enhanced solvent capacity with respect to said gilsonite, etc., body constituent materially in excess of the selective solvent capacity of the several ingredients of such admixed solvent if used alone, said body constituent being dissolved in sufficient proportion in said solvent mixture to give a viscosity up to the order of 50 centipoises at 25° C.

5. An ink of the character described comprising as a major body or binder constituent thereof a material selected from the group consisting of gilsonite, asphalt, and mixtures thereof, dissolved in a solvent consisting of a mixture having as essential major ingredients a petroleum naphtha boiling range up to 130° C. and an aliphatic alcohol having a boiling point of the order of 100° C. or less admixed to form a minimum boiling point-maximum vapor pressure azeotropic mixture having a constant boiling point substantially below the boiling point of each said ingredient and enhanced solvent capacity with respect to said gilsonite, etc., body constituent materially in excess of the selective solvent capacity of the several ingredients of said admixed solvent if used alone, said body constituent being dissolved in sufficient proportion in said solvent mixture to give a viscosity up to the order of 50 centipoises at 25° C.

6. An ink of the character described comprising as a major constituent thereof a material selected from the group consisting of gilsonite, asphalt, and mixtures thereof dissolved in a solvent consisting of a mixture having as essential major ingredients a petroleum naphtha and isopropyl alcohol selected with respect to said petroleum naphtha to form an azeotropic mixture therewith having a constant boiling point of the order of 100° C. or less and enhanced solvent capacity with respect to said gilsonite, etc., materially in excess of the selective solvent capacity of the several ingredients of said admixed solvent if used alone whereby sufficient of said gilsonite, etc., may be dissolved in said solvent mixture to give a viscosity of the order of upward of 50 centipoises at 25° C.

7. An ink of the character described comprising as a major body or binder constituent thereof a material selected from the group consisting of gilsonite, asphalt, and mixtures thereof, dissolved in a solvent consisting of an azeotropic mixture having as an essential major ingredient a petroleum naphtha having 8 carbon atoms or less in the chain, and an aliphatic alcohol having 5 carbon atoms or less, said ingredients being admixed in proportions to give a minimum boiling point-maximum vapor pressure azeotropic mixture having a constant boiling point of the order of 100° C. or less.

8. An ink of the character described comprising as a major body or binder constituent a material selected from the group consisting of gilsonite, asphalt, and mixtures thereof, dissolved in a solvent produced by mixing a petroleum naphtha having a boiling point of approximately not more than 130° C. with an aliphatic alcohol having a boiling point of approximately not more than 100° C. in predetermined proportions substantially equivalent to an azeotropic mixture thereof to produce such a mixture boiling below 100° C. and an ink viscosity of the order of not more than 50 centipoises at 25° C.

9. An intaglio printing ink of the character described comprising as a major body or binder constituent a material selected from the group consisting of gilsonite, asphalt, and mixtures thereof, dissolved in a solvent composed of an aliphatic alcohol of 5 carbon atoms or less and a petroleum naphtha whose major component consists of 8 carbon atoms or less and has a boiling point of not more than 130° C., with said alcohol and naptha admixed in predetermined proportions to produce a binary azeotropic mixture of a minimum boiling point-maximum vapor pressure character and having a boiling point of the order of not more than 100° C., said completed ink comprising up to the order of 50% of said gilsonite, etc. body constituent dissolved in said solvent.

10. A solvent for use in the manufacture of intaglio printing inks or the like of the character described and comprising as a major body or binder constituent of said ink a material selected from the group consisting of gilsonite, asphalt, and mixtures thereof; which comprises as essential major ingredients a petroleum naphtha and an aliphatic alcohol admixed in predetermined proportions to produce an azeotropic mixture having a boiling point of the order of 100° C. or less and having the solvent capacity of said mixture for said gilsonite, etc., body constituent greatly enhanced over the selective solvent capacity of the several respective ingredients to give to said mixture an increased solvent capacity with respect to the said body constituent sufficient to produce an ink solution having a viscosity up to the order of 50 centipoises at 25° C.

11. An intaglio printing ink of the character described comprising as a major constituent a material selected from the group consisting of gilsonite, asphalt, and mixtures thereof dissolved in a solvent composed of an aliphatic alcohol of 5 carbon atoms or less in the chain and a petroleum naphtha whose major component consists of 8 carbon atoms or less in the chain and has a boiling point of not more than 130° C., with said alcohol and naphtha admixed in proportions to produce a binary azeotropic mixture of a minimum boiling point-maximum vapor pressure character and having a boiling point of the order of not more than 100° C., said completed ink comprising up to 50% or more of said gilsonite, etc., dissolved in said solvent.

12. An ink of the character described, comprising as major body or binder constituent, a material selected from the group consisting of gilsonite, asphalt, and mixtures thereof, comprising up to substantially 50 per cent of the whole, dissolved in a solvent comprising as essential major ingredients a petroleum naphtha having a boiling point within a range of 60–135 degrees centigrade and an aliphatic alcohol having a boiling range of 80–100 degrees centigrade, said petroleum naphtha and aliphatic alcohol being selected from those within said ranges, with respect to each other, to produce a minimum boiling point-maximum vapor pressure azeotropic mixture having a boiling point substantially below the boiling point of each such ingredient, and the resulting dissolved material having viscosities up to substantially 50 centipoises at 25 degrees centigrade.

CLARENCE E. IRION.

CERTIFICATE OF CORRECTION.

Patent No. 2,331,194. October 5, 1943.

CLARENCE E. IRION.

It is hereby certified that error appears in the printed specification of the above numbered patent requiring correction as follows: Page 4, first column, line 12, for "ingreditents" read --ingredients--; line 44, for "an" read --as--; line 49, after "point" insert --substantially below the boiling point--; line 68, for "constans" read --constant--; and second column, line 9, before "boiling" insert --having a--; and that the said Letters Patent should be read with this correction therein that the same may conform to the record of the case in the Patent Office.

Signed and sealed this 30th day of November, A. D. 1943.

(Seal)

Henry Van Arsdale,
Acting Commissioner of Patents.